United States Patent
Cai et al.

(10) Patent No.: US 9,615,319 B2
(45) Date of Patent: Apr. 4, 2017

(54) POLICY CONTROL FOR A MACHINE-TO-MACHINE GROUP

(75) Inventors: Xuejun Cai, Beijing (CN); Yuxi Shen, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 77 days.

(21) Appl. No.: 14/410,277

(22) PCT Filed: Jun. 25, 2012

(86) PCT No.: PCT/CN2012/077430
§ 371 (c)(1),
(2), (4) Date: Dec. 22, 2014

(87) PCT Pub. No.: WO2014/000142
PCT Pub. Date: Jan. 3, 2014

(65) Prior Publication Data
US 2015/0341851 A1    Nov. 26, 2015

(51) Int. Cl.
*H04W 48/18* (2009.01)
*H04W 48/06* (2009.01)
(Continued)

(52) U.S. Cl.
CPC ......... *H04W 48/18* (2013.01); *H04L 41/0893* (2013.01); *H04L 41/5022* (2013.01);
(Continued)

(58) Field of Classification Search
CPC ....... H04W 48/08; H04W 48/06; H04W 4/02; G06F 15/173; G06F 15/06; H04L 12/14; H04L 12/56
(Continued)

(56) References Cited

U.S. PATENT DOCUMENTS

2009/0119694 A1* 5/2009 Hennequin ............ H04H 20/82
725/9
2010/0039941 A1* 2/2010 Tan ........................ H04L 12/14
370/241
(Continued)

FOREIGN PATENT DOCUMENTS

CN          102083035 A      6/2011
CN    WO 2011134317 A1 * 11/2011 .......... H04M 15/765
(Continued)

OTHER PUBLICATIONS

ZTE "Policy control based on groups of subscriber" 3GPP TSG SA WG2 Meeting #78, TD S2-101032, 2010, 2 pages.
(Continued)

*Primary Examiner* — Nathan Mitchell
(74) *Attorney, Agent, or Firm* — Rothwell, Figg, Ernst & Manbeck, P.C.

(57) ABSTRACT

A method for controlling, by a policy and charging enforcement unit, an access procedure of a mobile entity to a packet switched network via a cellular network, the mobile entity belonging to a group of mobile entities having common policy and charging rules. The method comprises the steps of receiving an attach request message to establish a group session for one of the mobile entities belonging to group, and checking whether a group subscription profile with policy and charging rules is provided in the policy and charging enforcement unit for the group, wherein if the policy and charging rules are provided in the policy and charging enforcement unit, the provided policy and charging rules are applied to the one mobile entity for which the attach request message has been received.

16 Claims, 4 Drawing Sheets

(51) Int. Cl.
*H04W 60/00* (2009.01)
*H04L 12/24* (2006.01)
*H04W 4/00* (2009.01)
*H04W 4/08* (2009.01)
*H04M 15/00* (2006.01)

(52) U.S. Cl.
CPC ......... *H04M 15/66* (2013.01); *H04M 15/765* (2013.01); *H04W 4/005* (2013.01); *H04W 4/08* (2013.01); *H04W 48/06* (2013.01); *H04W 60/00* (2013.01)

(58) Field of Classification Search
USPC ............................... 455/456.1; 370/259, 230
See application file for complete search history.

(56) References Cited

U.S. PATENT DOCUMENTS

| | | | |
|---|---|---|---|
| 2010/0048141 A1* | 2/2010 | Iwamura | H04W 24/08 455/67.11 |
| 2012/0023246 A1 | 1/2012 | Castro Castro et al. | |
| 2012/0084425 A1* | 4/2012 | Riley | H04M 15/00 709/223 |
| 2012/0144049 A1* | 6/2012 | Lopez Nieto | H04L 12/14 709/228 |
| 2012/0196566 A1* | 8/2012 | Lee | H04M 15/80 455/408 |
| 2012/0233325 A1* | 9/2012 | Zhou | H04L 12/1407 709/224 |
| 2013/0044646 A1* | 2/2013 | Qu | H04M 15/765 370/259 |
| 2013/0159521 A1* | 6/2013 | Marocchi | H04W 76/002 709/225 |

FOREIGN PATENT DOCUMENTS

| | | |
|---|---|---|
| CN | 102365880 A | 2/2012 |
| WO | 2011134317 A1 | 11/2011 |
| WO | 2011137564 A1 | 11/2011 |

OTHER PUBLICATIONS

3GPP, 3rd Generation Partnership Project; Technical Specification Group Services and System Aspects; Service requirements for Machine-Type Communications (MTC); Stage 1 (Release 11), 3GPP TS 22.368, V11.5.0, 2012, 25 pages.

3GPP, 3rd Generation Partnership Project; Technical Specification Group Services and System Aspects; General Packet Radio Service (GPRS); Service description; Stage 2 (Release 10), 3GPP TS 23.060, V10.2.0, 2010, 316 pages.

3GPP, 3rd Generation Partnership Project; Technical Specification Group Services and System Aspects; Policy and charging control architecture (Release 7), 3GPP TS 23.203, V7.14.0, 2012, 76 pages.

3GPP, 3rd Generation Partnership Project; Technical Specification Group Core Network and Terminals; Policy and Charging Control (PCC) over Gx reference point (Release 8), 3GPP TS 29.212, V8.16.0, 2012, 107 pages.

Extended European Search Report issued in related Application No. 12879703.2, dated Jan. 21, 2016, 8 pages.

* cited by examiner

POLICY CONTROL FOR A MACHINE-TO-MACHINE GROUP

CROSS REFERENCE TO RELATED APPLICATION(S)

This application is a 35 U.S.C. §371 National Phase Entry Application from PCT/CN2012/077430, filed Jun. 25, 2012, designating the United States, the disclosure of which is incorporated herein in its entirety by reference.

TECHNICAL FIELD

The present invention relates to a method for controlling, by a policy and charging enforcement unit, an access procedure of a mobile entity to a packet switched network via a cellular network, the mobile entity belonging to a group of mobile entities having common policy and charging rules. The invention furthermore relates to the policy and charging enforcement unit controlling the access procedure and to a method for handling policy and charging rules for a group of mobile entities by the policy and charging control entity. The invention furthermore relates to the policy and charging control entity handling the policy and charging rules for the group of mobile entities.

RELATED ART

A machine-to-machine (M2M) group is a group containing more than one homogenous member. The group members are the same from an operator's point of view, meaning that these members have the same policy properties or requirements. By way of example, in M2M applications, some Machine Type Communication (MTC) clients which have the same characteristics and features are grouped together for control and management as described in 3GPP Tech. Spec. 22.368, "Service Requirements for Machine Type Communications", 2010.

Figure 1:
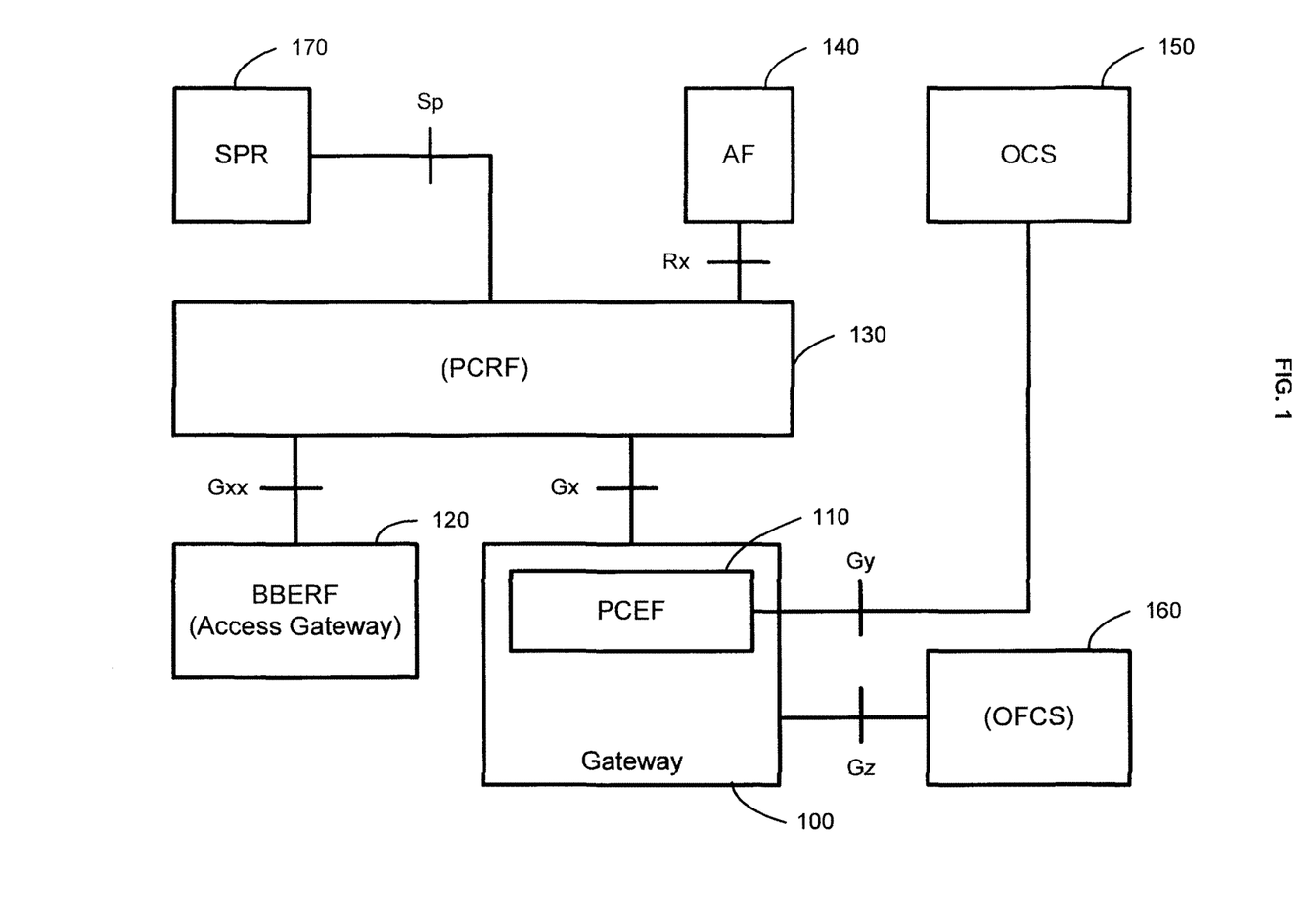
FIG. 1 shows a policy and charging control architecture in a 3GPP network as known in the art.

Furthermore, mobile communication networks are known which support policy and charging control (PCC), e.g. 3GPP networks. The PCC architecture provides policy, charging and quality of service (QoS) control to the network operators as described in 3GPP Tech. Spec. 23.203, "Policy and Charging Control Architecture", 2010. The reference network architecture for PCC defined in the evolved packet system EPS is shown in FIG. 1.

The PCC functionality is comprised by the functions of the policy and charging enforcement function PCEF 110, the bearer finding and the event reporting function, BBERF 120, the policy and charging rule function PCRF 130, the application function 140, the online charging system OCS 150, the offline charging system OFCS 160, and the subscription profile repository SPR 170.

The PCRF 130 is the policy engine of the PCC which combines the flow description received over the Rx reference point and the input received from the Gx or Gxx reference points with user-specific policies and data from the subscription profile repository SPR 170 to form session level policy decisions, and provides those to the PCEF 110 and the BBERF. The PCEF 110 enforces policy decisions received from the PCRF 130 and also provides the PCRF 130 with user- and access-specific information over the Gx reference point. The charging-related information received over the Gx interface is further used when it interacts with the OCS 150 and the OFCS 160. The PCEF 110 is located in the gateway 100, e.g. the PDN gateway in the evolved packet system EPS. When a mobile IP protocol (Internet protocol) is used between an access gateway, e.g. the S-gateway and the PDN-gateway, the BBERF 120 is introduced into the architecture. The PCRF 130 provides the authorized quality of service to the BBERF over the Gxx reference point. The SPR 170 contains subscription information such as user-specific policies and data. In PCC, in order to provide PCC control and enforcement, when a user equipment (UE) is connected to the network, the gateway (the PCEF 110) should request the PCRF 130 to create an IP-CAN session (IP Connectivity Access Network session) which is the association between the UE represented by an IPV4 anchor and IPV6 address, and UE identity information, if available, and a PDN (Packet Data Network) represented by a PDN ID (e.g. an APN Access Point Name). An IP-CAN session incorporates one or more IP-CAN bearers. Support for multiple IP-CAN bearers per IP-CAN session is IP-CAN-specific. Furthermore, in existing networks, like GSM and UMTS, usually there is only one default bearer (PDP Context, Packet Data Protocol Context) per IP-CAN session. The PCRF 130 should, for an IP-CAN session derive, from IP-CAN-specific restrictions, operator policy and SPR data, the list of permitted quality of service class identifiers and associated guaranteed bit rate, GBR, and maximum bit rate, MBR, limits for the IP-CAN session. In the current 3GPP PCC architecture as known from 3GPP Tech. Spec. 23.203, "Policy and Charging Control Architecture", 2010, the PCC control is associated with an IP-CAN session which is per subscriber based. THE PCRF 130 can only control the policy and charging rules based on per subscriber's profile. However, for machine-to-machine applications, the existing PCC mechanism is inefficient for an MTC group in which the MTC clients are homogenous and have the same properties. By way of example, if an MTC group has a lot of members, e.g. more than 100 clients, the PCRF has to establish at least 100 separate IP-CAN sessions for PCC control when each group member is connected to the network, although these members have the same profile and the PCRF/PCEF doesn't need to distinguish between them.

This will introduce significant system overload on the PCRF and the PCEF when the number of connected MTC clients is high. Furthermore, if the PCRF needs to modify the dynamic PCC rule of an MTC group it has to modify the PCC rule separately for each IP-CAN session of each MTC client in the MTC group. This results in a high signaling exchange between the PCEF/BBERF and the PCRF and may cause performance degradation and load burst.

Furthermore, in the existing PCC architecture, it is difficult to apply dynamic PCC rules for a specified MTC group, for example the common quality of service parameters, such as the group aggregated maximum bit rate AMBR, or other parameters, such as the maximum number of connected members. Furthermore, it is difficult to monitor the event for a certain group, e.g. the traffic usage of all members of a group.

SUMMARY

Accordingly a need exists to alleviate at least some of the above-mentioned drawbacks and to be able to handle policy and charging rules for a group of mobile entities having common policy and charging rules more efficiently.

This need is met by the features of the independent claims. In the dependent claims further embodiments of the invention are described.

According to a first aspect of the invention, a method for controlling, by a policy and charging enforcement unit, an access procedure of a mobile entity to a packet switched network via a cellular network is provided, wherein the mobile entity belongs to a group of mobile entities having common policy and charging rules. According to one step of the method, an attach request message is received to establish a group session for one of the mobile entities belonging to said group. Furthermore, it is checked whether a group subscription profile with policy and charging rules is provided in the policy and charging enforcement unit for said group. If it is determined that the policy and charging rules are provided in the policy and charging enforcement unit, the provided policy and charging rules are applied to said one mobile entity for which the attach request message has been received. If no group subscription profile with policy and charging rules is provided in the policy and charging enforcement unit for said group, the group subscription profile with the policy and charging rules is requested from a policy and charging control entity of the cellular network, and the requested group subscription profile is stored in the policy and charging enforcement unit. When a mobile entity belonging to the group attaches to the network, the policy and charging enforcement unit checks whether the group's subscription profile is present and in the affirmative applies the policy and charging rules. And if the mobile entity of the group is the first member of the group, the group's subscription profile is requested from the policy and charging control entity and stored in the policy and charging enforcement unit so that it can be enforced for future use when further mobile entities of the group access the packet switched network via the cellular network. The policy and charging rules are the same as for an IP-CAN session except that the rules are applied to all members of the group. If the mobile entity is not the first member of the group, an additional signal exchange between the policy and charging enforcement unit and the policy and charging control entity is avoided as the group's subscription profile is already stored in the policy and charging enforcement unit. The policy and charging rules for the group can be directly applied to the next member of the group if one member has already accessed the packet switched network.

Furthermore, it is possible to use a similar procedure when the mobile entities of the group are disconnected. If a message requesting a release of a group session is received from one mobile entity of the group, it may be checked whether the requesting mobile entity is the last member of the group present in the group session of said group. If this is the case, the termination of the group session for said group is initiated. If, however, the requesting mobile entity is not the last member of the group, the group session of said group is continued. This further helps to reduce the signaling load between the policy and charging enforcement unit and the policy and charging control entity, as the termination of the group session only has to be signaled to the policy and charging control entity if the mobile entity is the last member of the group.

If the existing policy and charging rules for one on-going group session should be changed, the following steps may be used. When it is detected that the existing policy and charging rules for an on-going group session should be changed to new policy and charging rules, the existing policy and charging rules may be replaced by the new policy and charging rules for the ongoing group session, and the new policy and charging rules can be enforced for the on-going group session for all mobile entities present in the on-going group session. In this embodiment it is no longer necessary to modify the policy and charging rules separately for each mobile entity of the group, as each member of the group will use the same policy and charging rules of the group session. As the rules do not have to be modified separately for each member of the group, the signal exchange can be further reduced.

During a group session it may be necessary to monitor a parameter relating to the group session. According to one embodiment, the policy and charging enforcement unit may receive a request message requesting the monitoring of a parameter relating to the group session. If this is the case, the requested parameter relating to the group session may be monitored and the requested parameter relating to the group session can be reported to the policy and charging control entity. The policy and charging enforcement unit can monitor the requested parameter and can report it to the policy and charging control entity. The parameter to be monitored may be the maximum bit rate, or a QCI (Quality of Service Class Identifier). Furthermore, the parameter to be monitored may be an overall traffic volume of the group session generated by all members of the group which are currently present in the group. In this case the traffic volume of all mobile entities connected to the group session is monitored and if a predefined traffic threshold contained in the request message requesting the monitoring is reached, a report about the reached traffic threshold can be transmitted to the policy and charging control entity. This helps to more easily enforce the group related parameters as the policy and charging enforcement unit reports the monitored parameter to the policy and charging control entity for the whole group. This furthermore reduces the signaling between the policy and charging control entity and the policy and charging enforcement unit. In this context it is possible that the traffic volume of all mobile entities connected to the group session is monitored since the time at which the last report about the reached traffic threshold has been transmitted to the policy and charging control entity. As an alternative it is possible to report the monitored parameter at regular intervals.

Another parameter that may be monitored is the number of mobile entities present in the group session of the group. The number of mobile entities connected to the group session can be monitored and if a threshold number of mobile entities contained in the request message requesting the monitoring is reached, a report about the reached threshold number is transmitted to the policy and charging control entity.

With this embodiment it is possible to limit the maximum group members that are connected in the session.

The invention furthermore relates to the policy and charging enforcement unit controlling the access procedure of a mobile entity to the packet switched network, the mobile entity belonging to the group having the common policy and charging rules. The policy and charging enforcement unit contains a receiver configured to receive an attach request message to establish a group session for one of the mobile entities belonging to that group. Furthermore, a processing unit is provided configured to check whether a group subscription profile with policy and charging rules is provided in the policy and charging enforcement unit for said group. If the policy and charging rules are provided in the policy and charging enforcement unit, the control unit will apply the provided policy and charging rules to said one mobile entity for which the attach request message has been received. If no group subscription profile with policy and charging rules is provided in the policy and charging enforcement unit for said group, the control entity requests the group's subscription profile with the policy and charging rules from the policy and charging control entity of the cellular network and stores the requested and received group subscription profile in the policy and charging enforcement unit. The policy and charging enforcement unit may work as described in more detail above.

The invention furthermore relates to a method for handling policy and charging rules for a group of mobile entities by a policy and charging control entity. The mobile entities access the packet switched network via the cellular network and belong to a group of mobile entities having common policy and charging rules. The method comprises the step of receiving a request message requesting establishment of a group session for said group. Furthermore, the policy and charging rules for said group are determined and the determined policy and charging rules are stored in the policy and charging control entity. Furthermore, the determined policy and charging rules are transmitted to the policy and charging enforcement unit of the cellular network. In addition, a request is transmitted to the policy and charging enforcement unit to monitor a parameter relating to the group session. Furthermore, a report is received from the policy and charging enforcement unit including the monitored report. The monitored parameter is then processed and a reaction to a monitored parameter is determined. By way of example, the step of determining a reaction may contain the step of transmitting new policy and charging rules to the policy and charging enforcement unit. The policy and charging control entity can then perform appropriate actions for the reported parameter. By way of example, if the reported parameter is the overall traffic volume of the group session generated by all members of the group and if a threshold set by the policy and charging control entity has been reached, the quality of service for the group may be degraded.

The invention furthermore relates to a policy and charging control entity configured to handle the policy and charging rules for the above-mentioned group of mobile entities having the same policy and charging rules, the members of the group accessing the packet switched network via a cellular network. The policy and charging control entity comprises a receiver configured to receive a request message requesting establishment of a group session for the group. Furthermore, a control unit is provided configured to determine the policy and charging rules for said group and to store the determined policy and charging rules in the policy and charging control entity. Furthermore, a transmitter is provided configured to transmit the determined policy and charging rules to the policy and charging enforcement unit of the cellular network. The control unit is furthermore configured to initiate a transmission of a request to the policy and charging enforcement unit to monitor a parameter relating to the group session and configured to process the report received from the policy and charging enforcement unit and to determine a reaction thereon. The monitored parameter may be a parameter mentioned above such as a maximum overall traffic volume, or the number of group members present in the session. The policy and charging control entity can then react accordingly to either limit the number of connected members and/or to adapt quality of service parameters in dependence on the monitored parameter.

BRIEF DESCRIPTION OF THE DRAWINGS

The invention will be described in further detail below with reference to the accompanying drawings, in which.

DETAILED DESCRIPTION

In the following embodiments explained it is assumed that all mobile entities belonging to a group have the same policy and charging control profile properties. This means that the PCRF, i.e. the policy and charging control unit, treats all members of the group in the same way. The group may be a group of mobile entities of a machine-to-machine group. However, the mobile entities may also be a mobile entity used by a human being, different mobile entities being grouped to a group.

Nevertheless, the invention is applicable as well to mobile entities belonging to a group having the same policy and charging control profile properties only for one or some of the properties in the policy and charging control profile. In other words, here not all but just one or some properties are the same. Doing so, a mobile entity can provide for a policy and charging control profile with both subscriber specific properties and as well properties specific to one or more groups.

In any way, the group subscription information may be stored in the HSS (Home Subscription Server) and/or SPR. The information shall include the group identity, name, and other information, e.g. group-specific policies. This information should be part of the group subscription profile.

When a mobile device of the group attaches to the network its group identity should be retrieved along with other information from the HSS by the SGSN/MME (Serving GPRS Support Node/Mobility Management Entity). Then the SGSN/MME transfers the group information to the gateway (GGSN, Gateway GPRS Support Node, or PDN Gateway) via control plane messages, for example "create PDP context request" in the GPRS network. After having received such a message the gateway, i.e. the PCEF or the policy and charging enforcement unit, checks if the current mobile entity is the first connected member of the group and the gateway determines that the PCC authorization is required. The PCEF, also shown in FIG. 4 and explained in further detail below can send a "group session establishment" message to the policy and charging control entity 50 shown in FIG. 5 and explained in more detail further below.

Figure 5:
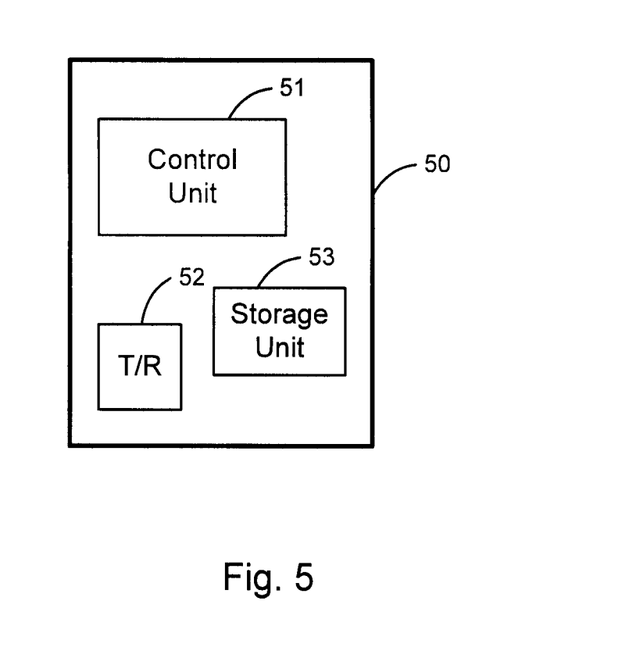
FIG. 5 is a schematic view of a policy and charging control entity handling the policy and charging rules for the group of the invention.

The group ID should be included in the message. If the PCRF 50 doesn't have the group-related subscription information, it sends a request to the SPR in order to receive the information. After having received the response from the SPR, the PCRF 50 makes the authorization policy decision. The PCRF sends the decision to the PCEF 40 and may include the following information: the PCC rules to activate and the event triggers to report. As will be explained further in detail below, the event triggers relate to a parameter to be monitored by the PCEF and to be reported to the PCRF.

Figure 4:
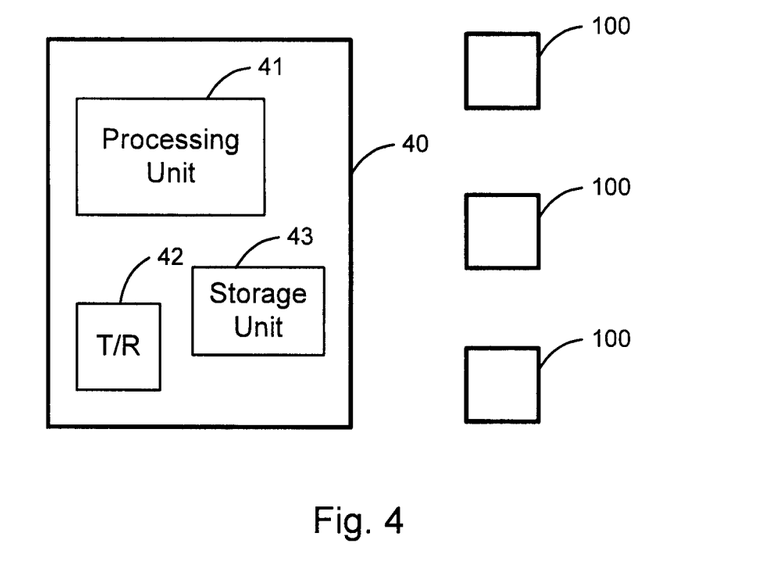
FIG. 4 is a schematic view of a policy and charging enforcement unit of the invention.

The policy and charging rules allow the enforcement of the policies associated with the group session. These rules apply for all IP-CAN sessions belonging to the same group. The PCC rules are the same as for an IP-CAN session except that the rules are applied to all members of a specified group. In addition to existing quality of service parameters such as the QCI or MBR, other parameters could be defined in the group, e.g. a maximum number of group members could be defined to limit the concurrently connected members of a group. The event triggers indicate to the PCEF 40 which group events should be reported to the PCRF 50. Some specific event triggers could be defined for the group session. For example, a group usage report is used to monitor the traffic usage of all members of the group. After the group session is created the PCEF then enforces the PCC rules sent by the PCRF and reports the registered events.

If a group session is already created for a certain group between the PCEF 40 and the PCRF 50, the newly connected mobile entity of that group will reuse the same PCC rules of the group session. The group session could be terminated by either the PCEF 40 or the PCRF 50. If the last member of a group is disconnected from the gateway, the PCEF should initiate the procedure to terminate the group session. In another embodiment it is possible that the PCRF 50 decides to terminate the group session due to an internal trigger or trigger from the SPR.

In connection with FIGS. 4 and 5 the policy and charging enforcement unit 40 and the policy and charging control entity 50 are shown in further detail. The policy and charging enforcement unit 40 may be incorporated into an architecture, as shown in FIG. 1, as a PCEF provided in a gateway. The policy and charging control entity 50 may be incorporated into an architecture as shown in FIG. 1 by a PCRF. Both the PCRF 50 and the PCEF 40 allow an improved policy control for mobile entities belonging to a group having common policy and charging rules as described in the summary part of the description and as described in further detail below.

The policy and charging enforcement unit shown in FIG. 4 comprises a receiver 42 configured to receive an attach request message, e.g. from an SGSN, to establish a group session for one of the mobile entities belonging to the group. Furthermore, a processing unit 41 is provided that controls the functioning of the policy and charging enforcement unit and which checks whether a group subscription profile with policy and charging rules is provided for said group. The policy and charging rules for a group for which at least one member is already present in a session, are stored in a storage unit 43.

The processing unit 41 applies the policy and charging rules to the mobile entities 100 present in a session of a group. If an attach request message to establish a group session is received by transmitter/receiver 42 and no group subscription profile is contained in storage unit 43, the processing unit 41 initiates a request transmitted to the policy and charging control entity 50 of the cellular network.

The policy and charging control entity 50, which handles the policy and charging rules for the different members of the group, comprises a transmitter/receiver 52 allowing a communication with other entities of a mobile communications network inter alia allowing the communication with the policy and charging enforcement unit 40. The policy and charging control entity 50 contains a storage unit 53 containing policy and charging rules for the different groups. Control unit 51 determines the policy and charging rules for the group for which a request message requesting establishment of a group session is received, transmitter/receiver 52 transmitting the policy and charging rules to the enforcement unit 40. If the entity 50 does not contain policy and charging rules for the requesting group, a request may be sent to an SPR as explained in connection with FIG. 1.

The protocol and signaling flow for group session management between the policy and charging enforcement unit and the policy and charging control entity could be based on an existing Gx interface as defined in 3GPP see 3GPP Tech. Spec. 29.212, "Policy and Charging Control over Gx reference point", 2010. In the following a non-roaming scenario is considered, however the invention can also be applied in a roaming scenario. Furthermore, the following description uses the GPRS network as known from 3GPP Tech. Spec. 23.060, "General Packet Radio Service (GPRS), Service Description", 2010, as an example, however, the invention could also be applied to other networks.

In the following, a group session establishment procedure is described in further detail with reference to FIG. 2.

In a first step, a mobile user entity belonging to a group of mobile entities having common policy and charging rules initiates an attach request process. After authentication, the SGSN retrieves the subscription information from the HSS and responses back to the attach request from the UE. Among the subscription information the group-related information is included in the message.

Figure 2:
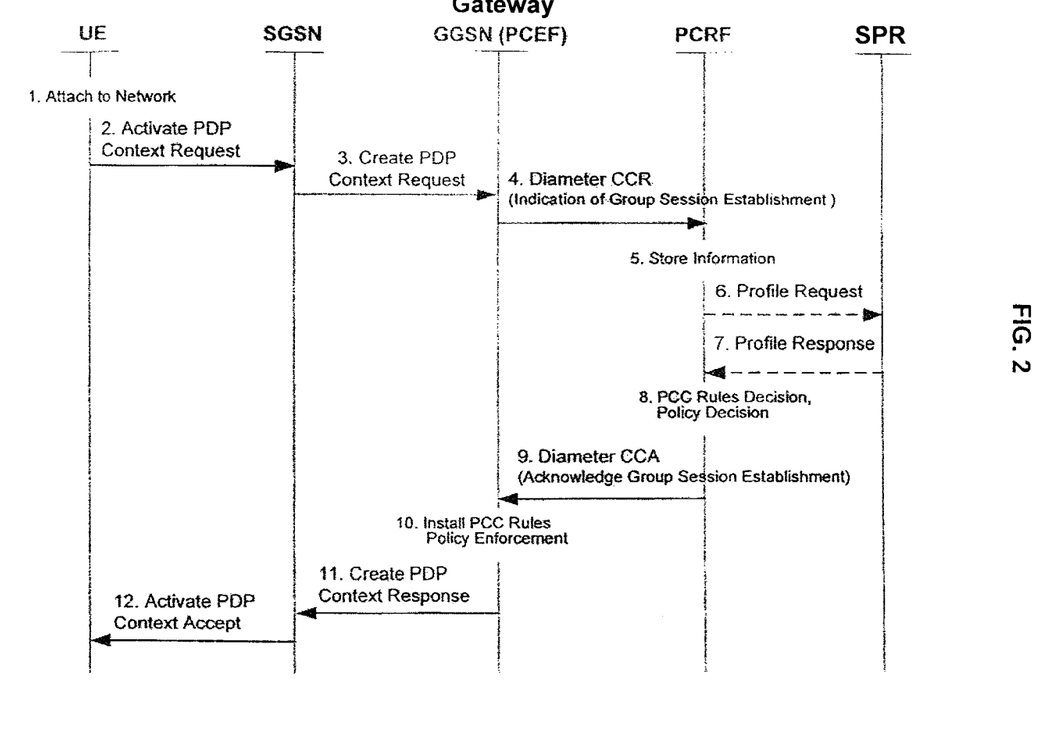
FIG. 2 shows a diagram indicating the message exchange when a group session is established for the first member of a group according to the invention.

As shown in step 2 of FIG. 2, in order to activate the PDP context, the UE sends an Activate PDP Context Request message to the SGSN. The SGSN validates the Activate PDP Context Request and sends a create PDP Context Request to the GGSN. The group-related information should be included in the request message sent to the GGSN. The GGSN plays the role of the policy and charging enforcement unit contained in the gateway as shown in FIG. 1 and as explained above in connection with FIG. 4. In step 3, upon reception of the request message from the SGSN, the PCEF shall check the included group ID to see if the UE is the first member of its group connected to the GGSN.

As shown in step 4 of FIG. 2, if the UE is the first connected group member, the PCEF starts a new Gx session by sending a diameter CCR (Credit Control Request) to the policy and charging control entity, PCRF shown in FIG. 5 using the CC request type AVP set to the value "initial request". The PCEF shall provide group identity information to indicate that the request is for a group session.

In step 5 of FIG. 2 the PCRF stores the information received in the CCR from the PCEF. In step 6, if the PCRF requires group-related information and does not have it, the PCRF sends a request to the SPR in order to receive the group-related information. In step 7, the SPR replies with the group-related information containing the information about the allowed services, quality of service information and PCC rules information.

In step 8, the PCRF selects how it generates the PCC rules to be installed. The PCRF may also make a policy decision by deriving an authorized quality of service and by deciding whether service flows described in the PCC rules are to be enabled or disabled. Furthermore, the PCRF stores the selected PCC rules.

In step 9 the PCRF transmits the PCC rules to the PCEF using diameter CCA (Credit Control Answer). The PCRF may also provide group event triggers listing events which the PCRF is interested in. Furthermore, the PCRF may provide authorized QoS for individual members or the entire group, e.g. the maximum bit rate for each member or for the entire group.

In step 10 the PCEF installs the received PCC rules. The PCEF also enforces the authorized quality of service and enables or disables service flows according to the flow status of the corresponding PCC rules. In step 11, the PDP context response is transmitted to the SGSN and in step 12 an activate PDP context accept message is transmitted to the user equipment.

In the following, the termination of a group session will be described in further detail. The termination could be initiated either by the PCEF or the PCRF. First the PCEF-initiated termination is explained:

In a first step the PCEF detects that the termination of a group session is required, e.g. the IP-CAN bearer of the last member belonging to the group is removed from the PCEF. In a second step the PCEF sends a request, said request being called CCR in one embodiment, to the PCRF indicating the group session termination. The PCEF requests the termination of the group session using a request type, said request type being called in one embodiment a CC request type AVP, set to the value "termination request".

In a third step the PCRF removes the information related to the terminated group session, e.g. the subscription information etc., and acknowledges the group session termination by sending an acknowledgement, said acknowledgement being called CCA in one embodiment, to the PCEF.

In another embodiment the group session termination is initiated by the PCRF. In this example, in a first step the PCRF detects that the termination of a group session is required due to an internal trigger or request from the SPR.

In a second step the PCRF sends a diameter RAR (Reauthorization Request) including the session release cause AVP to request that the PCEF terminates the group session.

In a third step the PCEF removes all the PCC rules which are applied to the group session. In a fourth step the PCEF sends an RAA to acknowledge the RAR. In a fifth step the PCEF applies IP-CAN specific procedures to terminate all sessions belonging to the group.

Furthermore, the invention relates to a group session modification which can be initiated either by the PCRF or the PCEF.

First of all the PCRF-initiated group session modification is explained:

1. The PCRF receives an internal or external trigger to re-evaluate PCC rules and policy decision for a group session. Possible external trigger events are described below.
2. The PCRF selects the PCC rule(s) to be installed, modified or removed for the group session.
3. The PCRF stores the updated PCC rules.
4. The PCRF sends a diameter RAR to request that the PCEF installs, modifies or removes PCC rules and updates the policy decision.
5. The PCEF installs, modifies or removes the identified PCC rules. The PCEF also enforces the authorized QoS and enables or disables service flow according to the flow status of the corresponding PCC rules.
6. The PCRF sends a diameter RAA (Re-Auth-Answer) to acknowledge the RAR. The PCEF informs the H-PCRF about the outcome of the PCC rule operation.

In another embodiment, the group session modification may be initiated by the PCEF as explained in further detail below:

1. The PCEF decides to initiate group session modification due to a specific event (e.g. group usage report) or an internal trigger. It is to be noted that a request for an IP-CAN session modification of an individual UE will not trigger a group session modification.
2. The PCEF sends a CCR command to the PCRF including the CC request type AVP set to the value "UPDATE_REQUEST". The PCEF should include the specific event that caused the group session modification within the event trigger AVP and the PCC rule names and their status.
3. If the PCRF requires group subscription related information and does not have it, the PCRF sends a request to the SPR in order to get the information.
4. The SPR replies with the group subscription related information.
5. The PCRF selects or generates PCC rules to be installed. The PCRF may also identify existing PCC rules that need to be modified or removed.
6. The PCRF provisions the PCC rules to the PCEF using a CCA command. The PCRF may also provide a new list of event triggers for which the PCRF requires to be notified.
7. The PCEF installs, modifies or removes the provided PCC rules. The PCEF also enforces the authorized QoS and enables or disables service flows according to the flow status of the corresponding PCC rules.

With the use of group sessions, it becomes possible to define specific group event triggers which monitor events for a group. The provisioning of the group event trigger may be done in a group session. By way of example, the following event trigger could be defined for a group session: a group usage report. This group usage report is similar to the usage report for an IP-CAN session as described in 3GPP Tech. Spec. 23.203, "Policy and Charging Control Architecture", 2010, except that it reports traffic volume consumed by all connected members of the group when a threshold set for the group is reached or when necessary for other reasons.

For the purpose of group usage monitoring control the PCRF shall request the total usage report trigger and provide the necessary group usage thresholds upon which the PCEF shall report to the PCRF. It could be possible for the PCRF to request a usage report from the PCEF containing the accumulated group volume usage since the time of the last group usage report.

Figure 3:
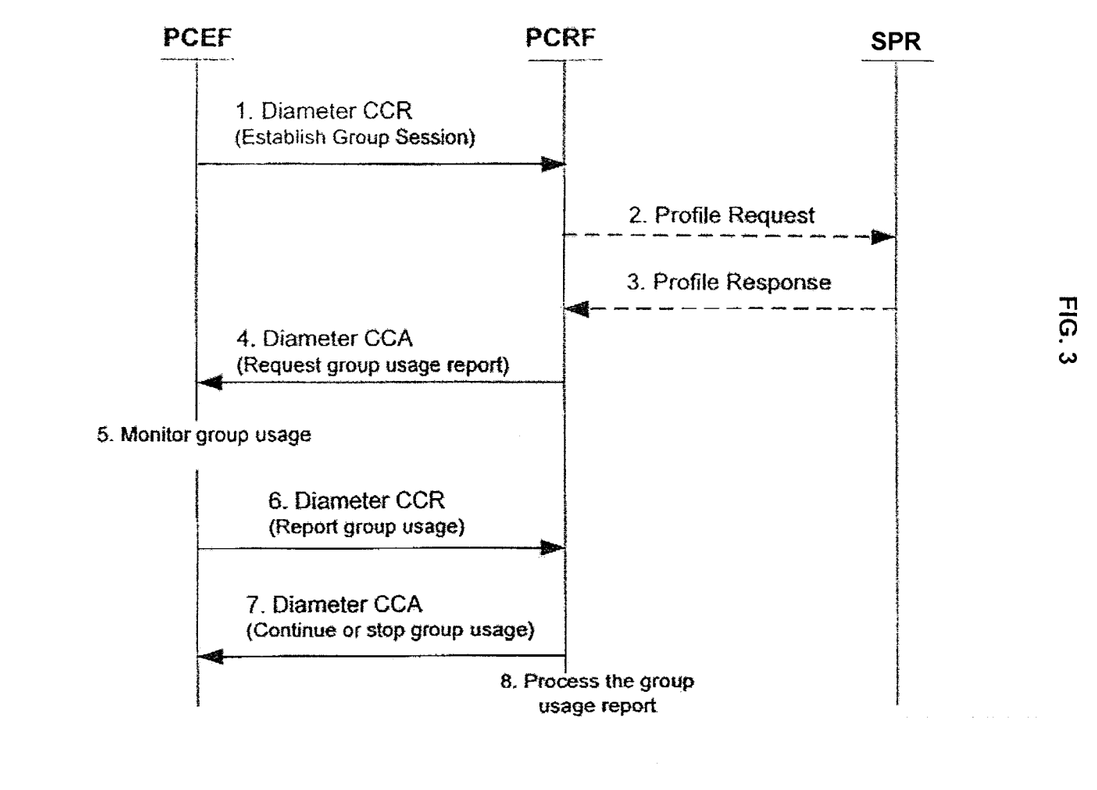
FIG. 3 is a diagram showing the message exchange for a group-related parameter to be monitored by the policy and charging enforcement unit of the invention.

One possible procedure of a group usage report is shown in FIG. 3 and described below, wherein, the numbers shown in FIG. 3 describing the different steps correspond to the numbers given in the detailed description below.

1. When the first member of a group is connected, the PCEF shall send a diameter CCS message to PCRF for requesting group session establishment.
2. If the OCRF doesn't have subscription information for this group, it sends a profile request message to an SPR to request group-related information including allowed group usage information.
3. The SPR replies with the group-related information containing group usage information.
4. If the PCRF needs to monitor the traffic usage of this group, the PCRF shall include an event trigger AVP in which the value of "GROUP_USAGE_REPORT" is set, in the CCA message to PCEF. Similar as the usage report per UE, the PCRF may provide applicable thresholds for a group usage report to the PCEF, together with respective monitoring keys in Usage-Monitoring-Information AVP. Note: the PCRF may subscribe to a group usage report event trigger with an RAR message after the group session has been established.
5. If usage monitoring is enabled for a group, the PCEF shall measure the traffic volume of all connected members of the group session or the traffic volume of certain service flows of the group session.
6. When the group usage threshold is reached, or some other conditions are met, the PCEF shall report accumulated group usage to the PCRF by sending a diameter CCR message with Usage-Monitoring-Information AVP which includes accumulated group usage since a last report.
7. Upon receiving the reported group usage, the PCRF shall deduct the value of the usage report from the total allowed usage for that group. If the PCRF wants to continue the usage monitoring for that group, it shall provide a new group usage threshold in the CCA; otherwise, no new group usage threshold shall be included.

8. The PCRF shall process the usage reports and perform appropriate actions for each report. The PCRF may also derive the new PCC rules based on the reported group usage and provision them to the PCEF, e.g., degrading the QoS of the group.

In the following the group member report is explained in more detail:

A group member report event trigger shall trigger the PCRF interaction for reporting the number of the connected members of the group. Based on the information, the PCRF could take appropriate actions such as degrading the QoS or limiting the concurrent group members. If the group member report event trigger is set then the PCRF shall also provide applicable connected group member thresholds for the group that should be monitored and reported by the PCEF. A new value "GROUP_MEMBER_REPORT" shall be defined for event trigger AVP. Three new AVPs may be defined for a group member report: group-member-report-information, member-report-granularity, and member-number.

The group-member-report-information may be of type grouped and may be used to exchange control information for a group member report. The member-report-level AVP may be of type Unsigned32 and may be used by the PCRF to provide the threshold level which is used by the PCEF to determine when it should report the number of connected group members. The Monitor-Direction AVP can be type enumerated: e.g., the following values can be defined: EXCEED (0), DROP (1). It is used to indicate if the PCEF shall report when the number of connected group members exceeds or drops the threshold level. For example, if the value of Member-Report-Level is set to 100 and the Monitor-Direction is set to 'EXCEED', the PCEF shall report whenever the (average) number of connected group members exceeds 100. To reduce the frequency of the information exchange, the PCEF could use the average number of connected group members in a pre-defined interval, e.g., 600 seconds. The Member-Number AVP is of type Unsigned32 and is used by the PCEF to provide the (average) number of connected group members to PCRF.

The PCRF could request a group member report by including even trigger AVP whose value is set to GROUP_MEMBER_REPORT" in either diameter CCA message, or in a so-called RAR message. The Group-Member-Report-Information shall be included in the message from the PCRF.

If a Group Member Report event is enabled, the PCEF shall monitor the number of connected members for that group. The average number of a pre-defined interval could be used. If the number exceeds or drops across the threshold, the PCEF shall report the number to the PCRF which could take appropriate actions according to the report, e.g., degrading the QoS of the group. The detail procedure of a group member report is similar to that of a Group Usage report and is not described here.

Summarizing, with the above-described invention the signaling traffic and the performance load of the PCEF and the PCRF are reduced for a group of mobile entities, as it is not necessary to repeat the same signaling for each member of the same group when exchanging policy and quality of service control information. It should have become clear from the above description that, the more members the group has, the better the performance can be improved.

Furthermore, it becomes possible to install and enforce a group-based policy and a quality of service control for the mobile entities of a group. Additionally, other quality of service parameters can be defined and enforced, e.g. the maximum connected group member number and a group allowed maximum bit rate. In addition, event triggers for a group can be introduced, e.g. a group usage report, in order to provide a better policy and quality of service monitoring and control.

The invention claimed is:

1. A method for controlling, by a policy and charging enforcement unit, an access procedure of a mobile entity to a packet switched network via a cellular network, the mobile entity belonging to a group of mobile entities having common policy and charging rules, the method comprising the steps of:
   receiving an attach request message to establish a group session for one of the mobile entities belonging to said group;
   checking, whether a group subscription profile with policy and charging rules is provided in the policy and charging enforcement unit for said group,
   wherein, in response to checking that the policy and charging rules are provided in the policy and charging enforcement unit, the provided policy and charging rules are applied to said one mobile entity for which the attach request message has been received, and wherein, in response to checking that no group subscription profile with policy and charging rules is provided in the policy and charging enforcement unit for said group, the group subscription profile with the policy and charging rules is requested from a policy and charging control entity of the cellular network and the requested group subscription profile is stored in the policy and charging enforcement unit;
   receiving a request message requesting a monitoring of a parameter relating to the group session, wherein a number of the mobile entities belonging to the group of mobile entities are connected to the group session;
   monitoring the requested parameter relating to the group session; and
   reporting the requested parameter relating to the group session to a policy and charging control entity.

2. The method according to claim 1, wherein, if a message requesting release of the group session is received from one mobile entity of said group, it is checked, whether the requesting mobile entity is the last member of the group present in the group session of said group, wherein, in the affirmative, the termination of the group session for said group is initiated, wherein, if the requesting mobile entity is not the last member of the group, the group session of said group is continued.

3. The method according to claim 1, wherein, when it is detected that existing policy and charging rules for an ongoing group session should be changed to new policy and charging rules, the existing policy and charging rules are replaced by the new policy and charging rules for the ongoing group session and the new policy and charging rules are enforced for the ongoing group session for all mobile entities present in the ongoing group session.

4. The method according to claim 1, wherein the parameter to be monitored is an overall traffic volume of the group session generated by all members of the group, wherein the traffic volume of all mobile entities connected to the group session is monitored and if a predefined traffic threshold contained in the request message requesting the monitoring is reached, a report about the reached traffic threshold is transmitted to the policy and charging control entity.

5. The method according to claim 4, wherein the traffic volume of all mobile entities connected to the group session is monitored since the time at which the last report about the reached traffic threshold has been transmitted to the policy and charging control entity.

6. The method according to claim 1, wherein the parameter to be monitored is a number of the mobile entities present in the group session of said group, wherein the number of mobile entities connected to the group session is monitored and if a threshold number of mobile entities contained in the request message requesting the monitoring is reached, a report about the reached threshold number is transmitted to the policy and charging control entity.

7. A policy and charging enforcement unit configured to control an access procedure of a mobile entity to a packet switched network via a cellular network, the mobile entity belonging to a group of mobile entities having common policy and charging rules, the policy and enforcement unit comprising:
a receiver configured to:
receive an attach request message to establish a group session for one of the mobile entities belonging to said group, and
receive a request message requesting a monitoring of a parameter relating to the group session; and
a processing unit configured to:
check whether a group subscription profile with policy and charging rules is provided in the policy and charging enforcement unit for said group,
wherein, if the policy and charging rules are provided in the policy and charging enforcement unit, the control unit is configured to apply the provided policy and charging rules to said one mobile entity for which the attach request message has been received, and
wherein, if no group subscription profile with policy and charging rules is provided in the policy and charging enforcement unit for said group, the control unit is configured to request the group subscription profile with the policy and charging rules from a policy and charging control entity of the cellular network, and to store the requested and received group subscription profile in the policy and charging enforcement unit;
monitor the requested parameter relating to the group session, wherein a number of the mobile entities belonging to the group of mobile entities are connected to the group session; and
report the requested parameter relating to the group session to the policy and charging control entity.

8. The policy and charging enforcement unit according to claim 7, wherein, when a message requesting release of a session is received from one mobile entity of said group, the processing unit is configured to check whether the requesting mobile entity is the last member of the group present in the group session of said group, wherein, in the affirmative, the processing unit is configured to initiate the termination of the group session for said group, wherein if the processing unit determines that the requesting mobile entity is not the last member of the group, the processing unit is configured to continue the group session of said group.

9. The policy and charging enforcement unit according to claim 7, wherein the processing unit is configured to detect when existing policy and charging rules for an ongoing group session should be changed to new policy and charging rules, wherein the processing unit is configured to replace the existing policy and charging rules by the new policy and charging rules for the ongoing group session and to enforce the new policy and charging rules for the ongoing group session for all mobile entities present in the ongoing group session.

10. A method for handling, by a policy and charging control entity, policy and charging rules for a group of mobile entities which are accessing a packet switched network via a cellular network, the mobile entities belonging to the group of mobile entities having common policy and charging rules, the method comprising the steps of:
receiving a request message requesting establishment of a group session for said group;
determining the policy and charging rules for said group, storing the determined policy and charging rules in the policy and charging control entity;
transmitting the determined policy and charging rules to a policy and charging enforcement unit of the cellular network;
transmitting a request to the policy and charging enforcement unit to monitor a parameter relating to the group session, wherein a number of the mobile entities belonging to the group of mobile entities are connected to the group session;
receiving a report from the policy and charging enforcement unit including the monitored parameter; and
processing the monitored parameter and determining a reaction to the monitored parameter.

11. The method for handling policy and charging rules according to claim 10, wherein the step of determining a reaction comprises the step of transmitting new policy and charging rules to the policy and charging enforcement unit.

12. A policy and charging control entity configured to handle policy and charging rules for a group of mobile entities which are accessing a packet switched network via a cellular network, the mobile entities belonging to the group of mobile entities having common policy and charging rules, the policy and charging control entity comprising:
a receiver configured to receive a request message requesting establishment of a group session for said group;
a control unit configured to determine the policy and charging rules for said group, and to store the determined policy and charging rules in the policy and charging control entity; and
a transmitter configured to transmit the determined policy and charging rules to a policy and charging enforcement unit of the cellular network, wherein the control unit is configured to initiate a transmission of a request to the policy and charging enforcement unit to monitor a parameter relating to the group session, wherein a number of the mobile entities belonging to the group of mobile entities are connected to the group session, and configured to process the report received from the policy and charging enforcement unit and to determine a reaction to the monitored parameter.

13. The method of claim 1, wherein the request message requesting the monitoring of the parameter relating to the group session comprises a Re-Auth-Request (RAR) message.

14. The method of claim 10, wherein the report comprises at least one of: a group-member-report information event trigger AVP, a member-report-granularity event trigger AVP, and a member-number event trigger AVP.

15. The method of claim 10, wherein the parameter comprises one or more of: a number of connected members of the group, an average number of connected members of the group in a pre-defined interval, an overall traffic volume of the group session generated by all members of the group, a group aggregated maximum bit rate.

16. The method of claim 10, wherein the parameter comprises a parameter aggregated over all connected members of the group.

\* \* \* \* \*